F. V. JOHNSON.
TRANSMISSION.
APPLICATION FILED JAN. 30, 1919.

1,338,777.

Patented May 4, 1920.
5 SHEETS—SHEET 1.

Fred V. Johnson
INVENTOR
BY William A. Stock
ATTORNEY

F. V. JOHNSON.
TRANSMISSION.
APPLICATION FILED JAN. 30, 1919.

1,338,777.

Patented May 4, 1920.
5 SHEETS—SHEET 2.

Fred V. Johnson
INVENTOR
BY
William A. Stock
ATTORNEY

Fred V. Johnson
INVENTOR
BY
ATTORNEY

F. V. JOHNSON.
TRANSMISSION.
APPLICATION FILED JAN. 30, 1919.

1,338,777.

Patented May 4, 1920.
5 SHEETS—SHEET 5.

Fred V. Johnson
INVENTOR

BY William A. Stock
ATTORNEY

UNITED STATES PATENT OFFICE.

FRED V. JOHNSON, OF BERKELEY, CALIFORNIA.

TRANSMISSION.

1,338,777.    Specification of Letters Patent.    Patented May 4, 1920.

Application filed January 30, 1919. Serial No. 274,154.

*To all whom it may concern:*

Be it known that I, FRED V. JOHNSON, a citizen of the United States, residing at Berkeley, in the county of Alameda and State of California, have invented certain new and useful Improvements in Transmissions, of which the following is a specification.

This invention relates to improvements in transmissions for motor driven vehicles, and particularly to a transmission adapted for tractors of the creeping tread type.

The transmission herein illustrated is especially designed for driving tractors wherein no differential mechanism is used but in which by means of clutches and brakes the driving wheel or track on either side of the tractor may be slowed down or stopped to cause the tractor to make a turn.

The principal object of my invention is to so construct the transmission that, by means of clutches, one or both sides may be disconnected from the driving mechanism, and at the same time to maintain a narrow width of transmission casing, while providing an effective support for the various rotating elements.

A further object is to provide for the application of a brake to either side of the transmission and to provide improved means for interconnecting the clutch and brake mechanisms whereby one is thrown into operation when the other is thrown out.

Another object of the invention is to provide improved means whereby power may be taken from the countershaft of the transmission while the tractor itself remains stationary, thereby adapting the tractor for driving auxiliary machinery.

Further objects are to provide means by which the distance between the axis of the driving pinions and their coöperating internal gears may be varied, thus providing adjustment to take care of wear and variation in size of the gears.

With these and other objects in view, the invention consists of certain novel features of construction, combinations and arrangements of parts hereinafter described and more specifically pointed out in the appended claims; it being understood that changes in form, proportion, size and minor details of construction within the scope of the claims may be resorted to without departing from the spirit of the invention or sacrificing any of the advantages thereof.

Figure 1:
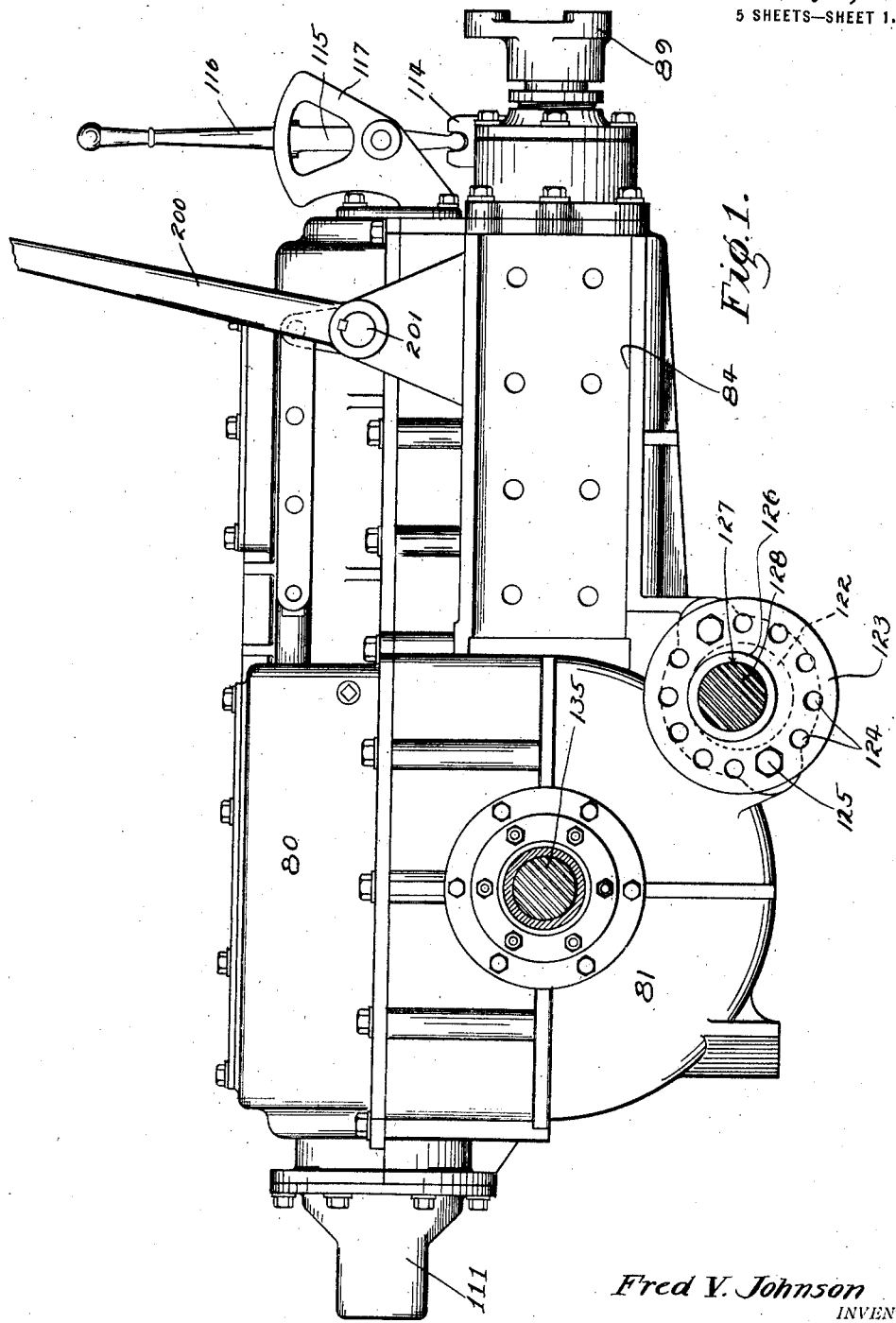

Figure 1— is a view in side elevation of the improved transmission.

Figure 2:
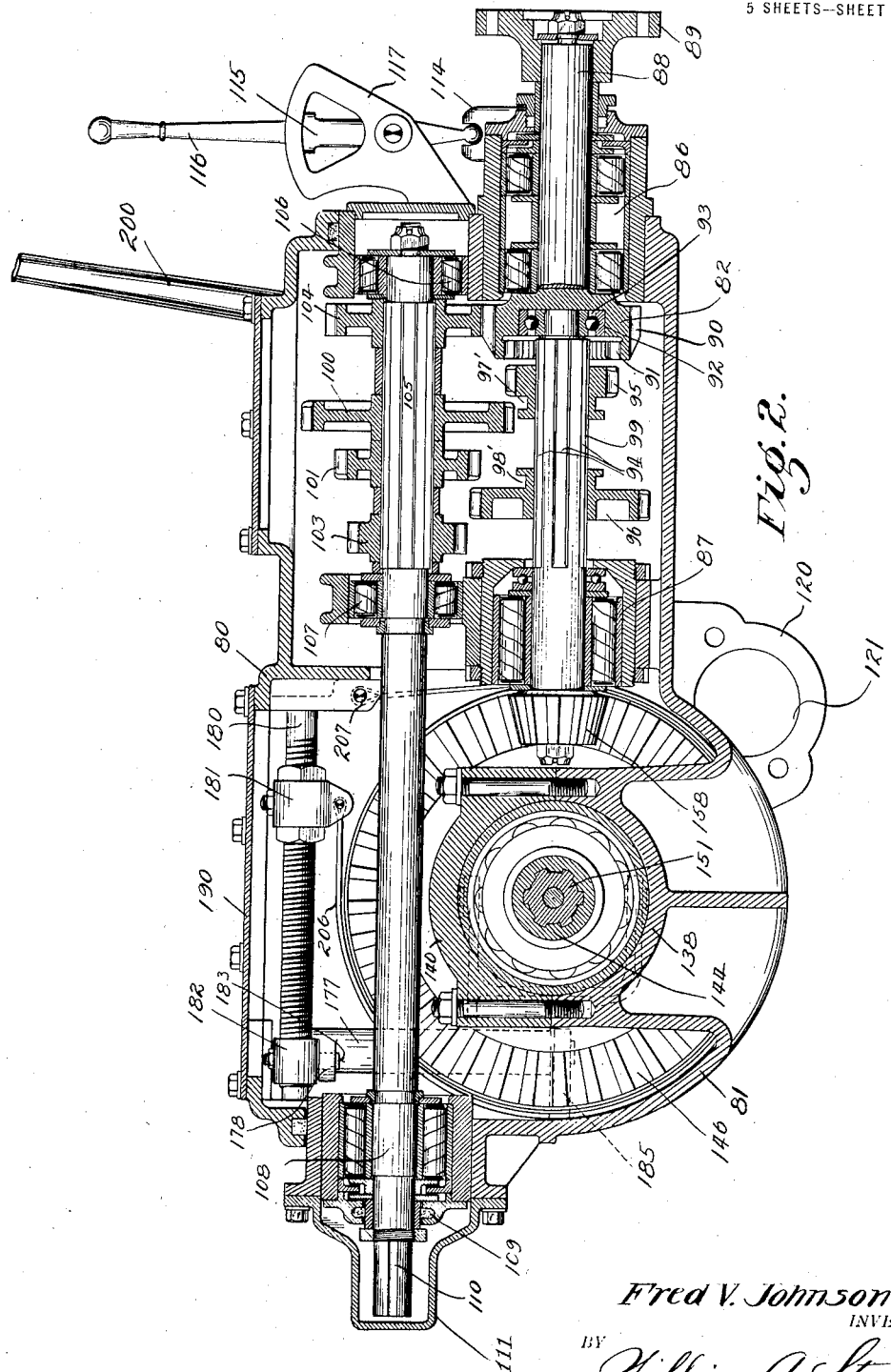

Fig. 2— is a view in longitudinal section through the same.

Figure 3:
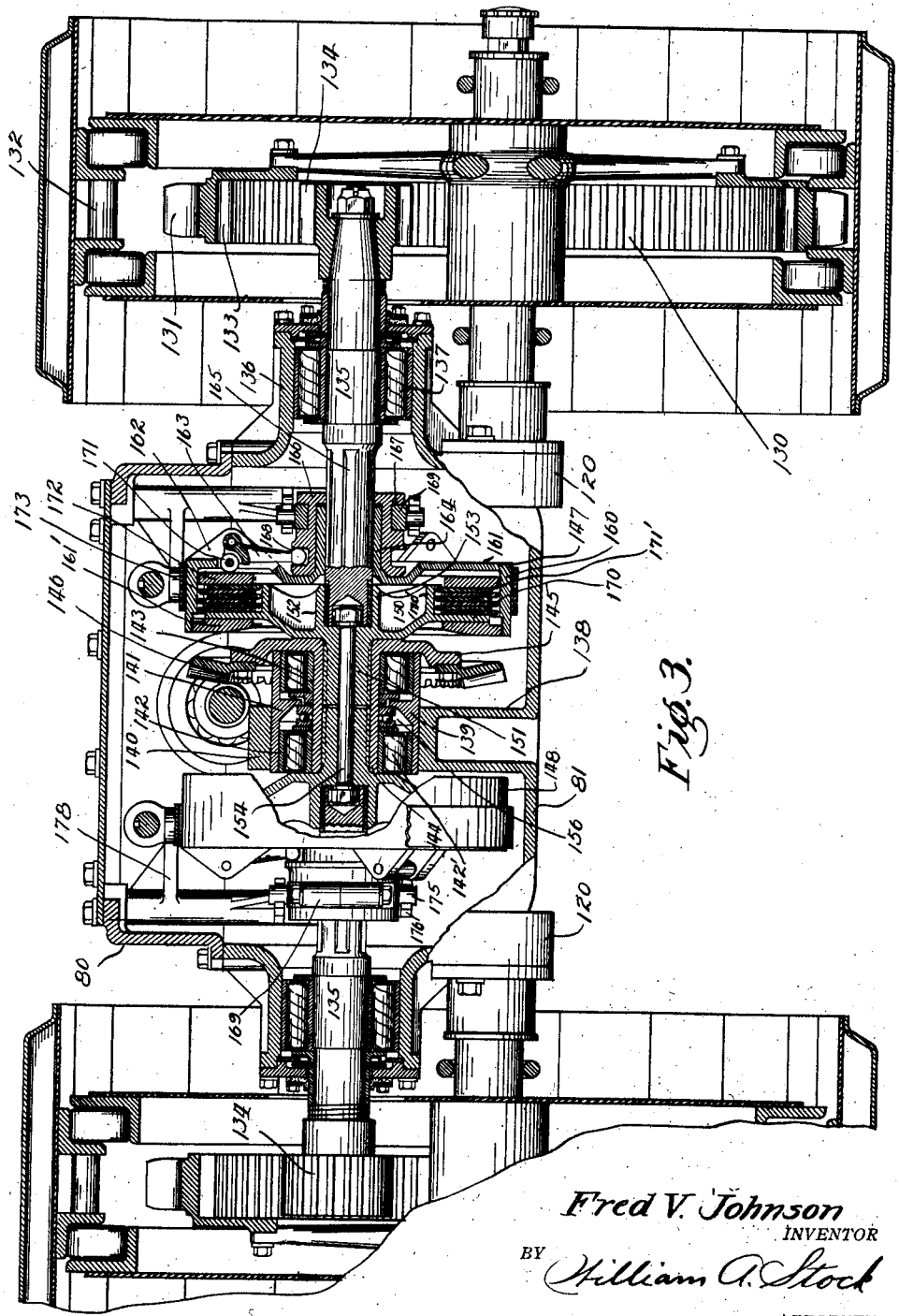

Fig. 3— is a view in transverse section showing the pinion shafts, clutch mechanism, and the manner in which the same are mounted in the casing.

Figure 4:
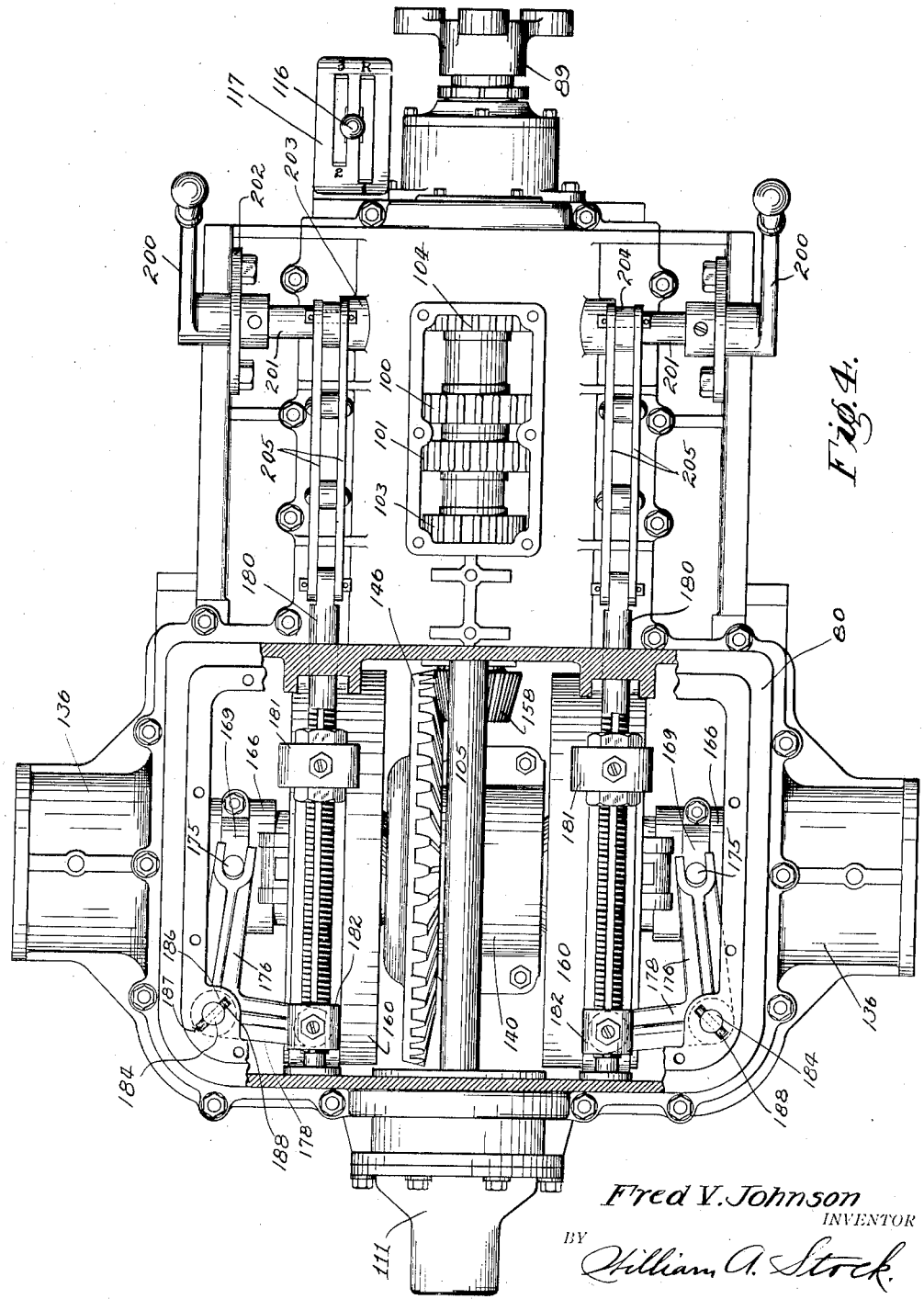

Fig. 4— is a view in plan of my improved transmission mechanism.

Figure 5:
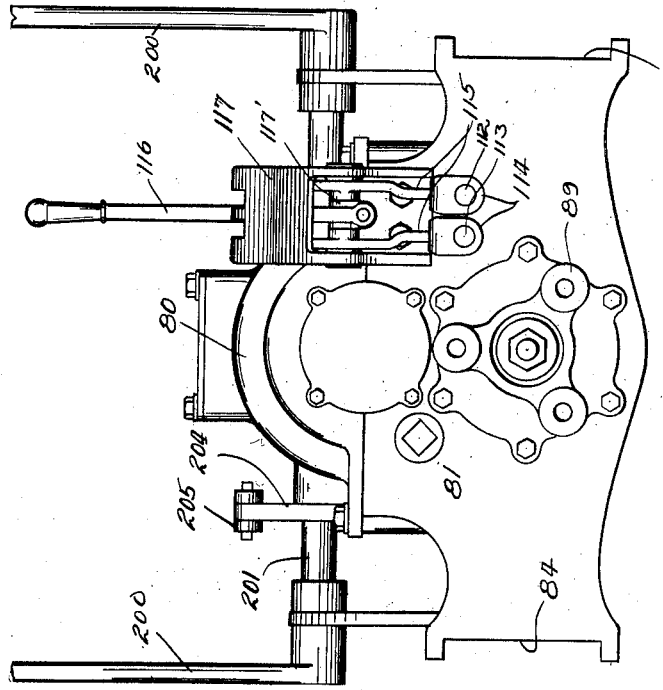

Fig. 5— is a view in front elevation of the transmission casing.

Figure 6:
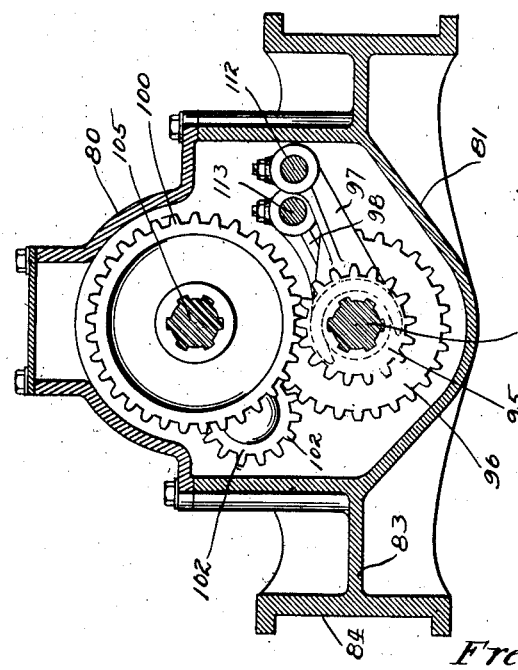

Fig. 6— is a view in section through the sliding gear box.

The transmission mechanism herein illustrated is mounted in a casing comprising the upper and lower portions 80 and 81. The latter is provided with transverse extensions 83 having seats 84 in which the frame members of the tractor body are bolted. As the pinion shafts of the transmission lie at right angles to the drive shaft, the casing is T-shaped, the drive and countershaft lying in the longitudinal portion corresponding to the stem of the T and the pinion shafts lying in the transverse portion corresponding to the crossbar of the T.

This longitudinal portion of the casing is provided with alining roller bearings 86 and 87, the former comprising two sets of rollers which are spaced some distance apart in order to provide a two point support for the power shaft 88. This shaft on the outside of the case, has attached thereto one member 89 of a flexible coupling through which the shaft receives power from an engine (not shown). On the end within the case, shaft 88 has an integrally formed gear 82 which has spur gear teeth 90 formed on the outer surface and which is recessed and provided with the internal gear teeth 91. The gear is further recessed as shown at 92 and has mounted therein a ball bearing 93 in which is journaled one end of the drive shaft 99. The other end of this shaft is revolubly mounted in bearing 87, the shaft between this bearing and the ball bearing 93 being splined as shown at 94. Slidably mounted on the splined portion of the shaft are gears 95 and 96 the hubs of which have circumferential grooves 97' and 98' for the reception of shifter forks 97 and 98. Gear 95 when moved in one direction is adapted to engage the internal gear teeth 91 and thus directly couple shafts 88 and 99, and when moved in the opposite direction is adapted to engage the teeth of gear 100. Gear 96 when moved in one direction engages the gear 101 and when moved in the opposite direction engages the idler gear 102 which is in constant mesh with the gear 103. The gears 100, 101 and 103 as well as the gear 104 are all mounted in a fixed position on the splined portion of counter shaft 105. Gear 104 is in constant mesh with the teeth 90 of the gear 82 so that the countershaft 105 rotates continuously with shaft 88.

The counter-shaft just mentioned is revolubly mounted in suitable roller bearings 106, 107 and 108 and extends through the latter bearing and through the casing which is provided with suitable means as shown at 109 to form a substantially oil tight joint around the shaft. On the outside of the casing this shaft has a key-seat as shown at 110 and a cover plate 111 is provided to secure a neat finish and to prevent accidents which might be caused by the revolving shaft engaging clothing or other loose material. When it is desired to drive machinery by means of the tractor engine cap 111 is removed and a pulley or other driving device is attached to the key-seated end of the counter-shaft. I have found this position of the countershaft at right angles to the axis of rotation of the vehicle wheels to be an advantage over the usual construction wherein the power to auxiliary devices is taken from a shaft which rotates on an axis parallel to the axes of the rotation of the supporting wheels.

The shifter forks 97 and 98 above mentioned are secured to rods 112 and 113 which extend through the front wall of the transmission casing and are there provided with slotted collars 114. The slots of these collars are engaged by the lower ends of levers 115, the upper ends of which are in turn engaged by the shifting lever 116. The latter is pivotally mounted on the collar 117' which in turn is pivotally mounted at right angles to the lever in bracket 117.

Formed on the sides of the casing 81 below the bottom thereof are brackets 120 having the cylindrical bores 121. Extending into this bore is a circular hub 122 formed on one face of the flanged plate 123. This plate is provided with a large number of holes 124 through two of which extend the holding bolts 125. The outer face of this flange is provided with a hub 126 and extending through the two hubs is a circular bore 127 which is eccentric to the outside of hub 122 and in which is held the supporting axle 128. This axle extends from one bracket to the other and projects laterally from the transmission case a sufficient distance to enable the supporting or driving wheels 130 to be revolubly mounted thereon. As here shown these wheels are provided with sprocket teeth 131 for driving the supporting tracks 132. Furthermore, they are provided with internal gear teeth 133 which are engaged by the drive pinions 134. As heretofore stated the pinions on the opposite sides of the machines are independently revoluble and each is attached to a pinion shaft 135 which have alining axes that lie in the same plane as the axis of shaft 88, but at right angles thereto.

The lower half of the transmission casing is provided with lateral extensions 136 in which are held roller bearings 137. In the center of the transmission case is provided a bridge wall 138 which is adapted to support a center bearing. As here shown this bearing comprises a cylinder 139 which is clamped on the bridge wall by means of the cap 140. Approximately in the center of this cylinder is an inwardly extending annular flange 141 which is adapted to transmit the thrust produced by the bevel gears hereinafter mentioned to the bridge wall. This center bearing has two outer roller rings 142 which fit within the cylinder 139 one on each side of the flange 141. The inner roller rings 143 are mounted on a long tubular hub 144 which is formed on the web 145 to the outer circumference of which is attached a toothed beveled gear 146.

To the right and left of the center bearing are two friction clutches 147 and 148, each of which has a circular driving member 150 from the back of which extends a hub 151. These hubs are splined and engage coöperating splines formed on the inner surface of hub 144 and the combined length of the clutch hubs is slightly less than that of hub 144. Members 150 are also provided with hubs 152 extending from the outer face thereof, which hubs are recessed and provided with bushings 153 to form bearings for the inner ends of the pinion shafts 135. The opposed members 150 are clamped against the opposite ends of hub 144 by means of the bolt 154. The ends of the pinion shafts which are journaled in bushings 153 are recessed to provide room for the head and nut of this bolt which construction enables me to maintain long bearings within the hubs 152. Thus it will be understood that the two members 150, the hub 144, web 145 with the toothed beveled gear attached thereto, are all rigidly held together by the bolt 154 forming a structure which rotates as a unit on roller bearings 142'. The thrust produced by the action of the pinion against the bevel gear 146 is transmitted through this structure to the left hand ring 143 (Fig. 3), and then to the ball thrust bearing 156 one ring of which abuts against the inwardly extending flange 141. The toothed gear 146 is driven by means of a coöperating toothed pinion 158 which is attached to shaft 99, and thus the unitary structure, the plates 150 of which form parts of the friction clutches 147 and 148, rotates continuously with the drive shaft.

The coöperating portion of each clutch comprises the housing 160 having formed on one side the web 161 in which are suitable openings for the movement of the compression members. On the outside of web 161 are several pair of ears 162 between which are pivotally mounted the compression levers 163. Web 161 is provided with an outwardly extending hub 164 which is interiorly splined to engage the splines 165 on the outer surface of the pinion shaft 135. Slidably mounted on the outside of hub 164 is a collar 166 which has circumferential grooves 167 and 168. The former is engaged by the yoke 169 while the latter receives the inner end of the levers 163. The plate 150 is continued outwardly and provided with a flat portion 170 which forms one of the friction members of the clutch. It also has a cylindrical portion 170' which on its outer surface has lugs for holding friction disks 173. The inner surface of housing 160 is provided with a similar lug by which the alternate friction disks are held in non-rotative relation to the housing. The short arm of the compression lever is provided with a roller 171 which bears against an annular plate 172 which is non-rotatively held on the lugs of the member 160. The movement of collar 166 compresses the disk 172 against the friction disks 173 which in turn frictionally engage the member 170 between ring 161' and the adjacent disk 173.

Yoke 169 is provided with pins 175 which are engaged by the forked ends of the arm 176 forming one of the arms of the bell crank 177 the other arm of which is shown at 178.

Slidably mounted on each side of the transmission case and in the top member thereof are rods 180 which, within the case are screw threaded and have engaged thereon collars 181 and 182. The latter collar is provided with a downwardly extending pin 183 which engages an opening in the arm 178. The hub of bell crank 177 is oscillatively mounted on the pin 184, the lower end of which is held in a bracket 185 while the upper end is held in a lug 186 having a transverse slot 187. Extending through the upper end of rod 184 is a pin 188 that is adapted to drop into the slot 187 and thus to hold the rod against rotation and to prevent it dropping downwardly. The rod is prevented from moving upwardly by the cover plate 190 and the pin itself can not move out of position due to the fact that it is only slightly shorter than the slot 187.

The rods 180 are moved by means of the operating levers 200. Each of these levers is attached to a shaft 201, one end of which is pivotally mounted in a plate 202, while the other end is held in the lug 203 formed on the side of the upper portion of the casing. On the shaft 201 is formed a crank arm 204, the outer end of which is engaged by a connecting rod 205, the other end of which engages the end of rod 180. On the under side of collar 181 are formed ears between which is pivotally mounted one end of brake band 206, which band extends around the outer surface of the clutch housing 160 and has its other end held on a pin 207.

In operation the power is transmitted from the motor to the shaft 88 and from the latter to shaft 99 either directly by engagement of gear 95 with teeth 91 or indirectly through the countershaft and the various toothed gears. As herein illustrated I have arranged the gear ratios so that when shafts 88 and 99 are directly connected shaft 99 will be driven at the intermediate speed for a given engine speed. This intermediate speed is used when the tractor is working under ordinary and usual loads and for light loads I provide a higher speed which is secured by engaging gears 95 and 100. On heavy duty work a lower speed may be obtained by shifting gear 96 into engagement with gear 101. The power from shaft 99 is transmitted through the pinion 158 to bevel gear 146 and through the hub of the latter to the hubs of the friction clutches. When these clutches are engaged the power is transmitted through the friction disks thereof and hubs 164 to the pinion shafts 135 and through the pinions on the latter to the driving wheels 130. When a turn is to be made the lever 200 on the side to which it is desired to turn is pushed forwardly, which movement operates the corresponding bell crank 177. The latter moves collar 166 and throws out of engagement the clutch operated thereby. If only a slight turn is desired this side of the machine may be left in this condition while the other side drives in a forward direction, but if a sharper turn is desired, the lever is moved farther forward which causes the brake band to engage the outer surface of the clutch housing and thus to stop the rotation of the pinion shaft on that side.

I claim as new and wish to cover by Letters Patent:—

1. A transmission of the character described comprising a casing, a speed-change mechanism therein comprising a power shaft, an alining driving shaft, a parallel counter-shaft, and an end on said counter-shaft extending through said casing for the attachment of auxiliary driving devices, a continuously meshing gear connection between said power shaft and said countershaft, gear means for connecting said drive shaft with either said power shaft or said counter-shaft, pinion shafts at right angles to said drive shaft, a rotating structure centrally disposed with respect to said pinion shafts, clutch means for engaging said pinion shafts with said structure, a toothed bevel gear carried by said structure, and a co-meshing toothed bevel pinion carried by said drive shaft.

2. A transmission of the character described comprising a casing, a speed-change mechanism therein comprising a power shaft, an alining driving shaft, a parallel counter-shaft, and an end on said counter-shaft extending through said casing for the attachment of auxiliary driving devices, a continuously meshing gear connection between said power shaft and said counter-shaft, gear means for connecting said drive shaft with either said power shaft or said counter shaft, pinion shafts at right angles to said drive shaft, a structure revolubly mounted in the center of said casing in alinement and centrally disposed with respect to said pinion shafts, said structure comprising a toothed bevel gear, oppositely disposed clutch driving members having recesses for journaling the inner ends of said shafts, clutch means for engaging said pinion shafts with said driving members, and a co-meshing toothed bevel pinion carried by said drive shaft.

3. A transmission of the character described comprising a casing, pinion shafts having alining axes revolubly mounted in said casing, a center bearing, a tubular sleeve revolubly mounted in said bearing, an annular web extending outwardly from said sleeve, a toothed bevel gear attached to said web, opposed clutch driving members, hubs on said members extending inwardly into said sleeve and having a combined length less than said sleeve, means for clamping said members rigidly to said sleeve, outwardly extending hubs on said members having recesses forming bearings for the inner ends of said shafts, clutch driven members revoluble with said shafts, a housing revoluble with said clutch driven members, coöperating friction disks carried by said driving and said driven members, clutch operating means for causing engagement between said friction disks, brake bands adapted to engage the outer circumference of said housings, and operating rods each having one of said brake bands and one of said clutch operating means attached thereto.

4. A transmission of the character described comprising a casing, side bearings and a center bearing carried by said casing, alining shafts revolubly mounted in said side bearings, a toothed bevel gear, a tubular hub on said gear revolubly mounted in said center bearing, opposed clutch driving members, hubs on said members extending inwardly into said tubular hub, means for clamping hubs of said members in said tubular hub and non-rotatively with respect thereto, cylindrical extensions on said driving members, lugs on said extensions, friction disks non-rotatively held on said lugs, a clutch housing having a cylindrical outer surface, lugs formed on the inside of said housing, coöperating friction disks carried by said lugs, outwardly extending hubs carried by said housings and non-rotatively held on said shafts, brake bands on the outside of said housings, means for compressing said friction disks and operating means having one of the brake hands and one of the disk compression means attached thereto.

5. A transmission of the character described, comprising a casing, pinion shafts disposed transversely to said casing, a center bridge wall in said casing, a cylindrical retaining ring held on said wall, a revolubly mounted structure having its axis in alinement with the axes of said shafts, bearings carried by said structure for the inner ends of said shafts, a pair of spaced roller bearings having their inner and outer rings seated on said structure and said ring respectively, an inwardly extending annular flange on said retaining ring, and a ball thrust bearing between said roller bearings, said thrust bearing having one ring resting against said flange and the opposed ring carried by said structure.

6. A transmission of the character described comprising a casing, a pair of pinion shafts revolubly mounted in said casing and having alining axes, a bearing retainer centrally disposed in said casing, an annular flange extending inwardly from said retainer, oppositely disposed clutch driving members, hubs on said members, a sleeve extending over said hubs and nonrotatably attached thereto, a toothed bevel gear attached to said sleeve, means extending through said hubs for clamping the same against the ends of said sleeve, spaced roller bearings having their inner and outer rings seated on said sleeve and said retainer respectively, a thrust bearing between said roller bearings having one ring seated against said flange and the other ring revoluble with said sleeve, bearings formed in said clutch driving members for the inner ends of said shafts, and coöperating clutch driven members attached to said pinion shafts.

7. A transmission of the character described comprising a casing, a pair of pinion shafts revolubly mounted in said casing and having alining axes, a bearing retainer centrally disposed in said casing, an annular flange extending inwardly from said retainer, oppositely disposed clutch members, hubs on said members, a sleeve extending over said hubs and keyed thereto, means extending through said hubs for clamping the same against said sleeve, spaced roller bearings having their inner and outer rings seated on said sleeve and said retainer respectively, a thrust bearing between said roller bearings having one ring seated against said flange and the other ring revoluble with said sleeve, bearings formed in said clutch members for the inner ends of said shafts, and coöperating clutch members attached to said pinion shafts.

8. A transmission of the character described comprising a casing, pinion shafts having alining axes revolubly mounted in said casing, a center bearing carried by said casing, a structure revolubly mounted in said casing, said structure comprising opposed clutch driving members, hubs on said members, a sleeve non-rotatably engaging said hubs and a driving gear attached to said sleeve, said clutch members having recesses to form bearings for the inner ends of said shafts, coöperating clutch driven members carried by said shafts, and means for engaging and disengaging said clutch members.

9. A transmission of the character described comprising a casing, pinion shafts revolubly mounted in said casing, a center bearing, a structure revolubly mounted in said bearing, said structure comprising a sleeve, a drive gear carried thereby, clutch driving members, hubs on said members extending into said sleeve, a bolt extending through said hubs for clamping the same to said sleeve, said hubs having oppositely disposed recesses to form bearings for the inner ends of said shafts, clutch housings mounted on said shafts, coöperating clutch disks carried by said housings and said clutch driving members, operating means for bringing said disks into frictional engagement, brake bands for engaging the outer surface of said clutch housings, and interconnected means for moving said clutch operating means and said brake bands.

10. A transmission of the character described comprising a casing, pinion shafts having alining axes revolubly mounted in said casing, a center bearing, clutch driving members revolubly mounted in said center bearing, means for driving said members, clutch housings non-rotatively mounted on said shafts, a brake band adapted to engage the outer circumference of each of said housings, coöperating friction disks carried by said members and said housings, operating means for compressing said disks, operating rods extending through said casing at right angles to said shafts and in the plane of said clutch housings, means connecting one end only of said brake bands to said rods, pivotally mounted bell-crank levers, arms on said levers engaging said rods and a second arm on each of said levers adapted to engage the operating means for one of said clutch disks.

In testimony whereof I affix my signature.

FRED V. JOHNSON.